United States Patent [19]
Wendorf

[11] 3,805,563
[45] Apr. 23, 1974

[54] AUTOMATIC CLOTHES WASHING MACHINE

[76] Inventor: Joaquin H. Wendorf, Rio de la Plata 108, Garza Garcia, Monterrey, Mexico

[22] Filed: Oct. 19, 1972

[21] Appl. No.: 298,818

[52] U.S. Cl............................ 68/23.1, 68/24, 68/208
[51] Int. Cl.......................... D06f 23/02, D06f 37/36
[58] Field of Search................................ 68/23.1, 24

[56] References Cited
UNITED STATES PATENTS

| | | | |
|---|---|---|---|
| 2,842,002 | 7/1958 | Stegman | 68/24 X |
| 2,990,706 | 7/1961 | Bochan | 68/24 X |
| 3,101,625 | 8/1963 | Horvath | 68/24 X |
| 3,575,022 | 4/1971 | Steele | 68/24 |

*Primary Examiner*—William I. Price
*Attorney, Agent, or Firm*—Stevens, Davis, Miller & Mosher

[57] ABSTRACT

An automatic clothes washing machine which comprises a housing, an imperforate stationary receptacle with its axis horizontally arranged in said housing, a perforate rotatory basket arranged with its axis colinear to the axis of said stationary receptacle and concentrically thereto, a sequence programming circuit, and a drive mechanism comprising a motor capable of rotating at a low speed and at a high speed in a first and a second opposite directions, a driving pulley directly connected to the shaft of said motor, a belt and pulley speed reducing mechanism between the pulley of said motor and the pulley of said rotating basket, means for engaging the pulley of said rotating basket with the pulley of said motor when the motor is rotating at a low speed in one of said directions, a centrifugal clutch directly engaged to the pulley of said motor, said centrifugal clutch being designed such that it will only act when the motor is rotating at said high speed in any of the two above mentioned directions, means for engaging said centrifugal clutch to the pulley of said rotating basket and to simultaneously disengage said speed reducing mechanism in order to drive the pulley of said rotating basket at a high speed when the motor is rotating in one direction, means for disengaging said centrifugal clutch from the pulley of said rotating basket and to simultaneously engage the speed reducing mechanism when the motor is rotating at a high speed in the opposite direction, in order to drive said basket at an intermediate speed; a centrifugal pump with its inlet connected by means of a flexible pipe to said stationary basket and with its outlet connected to drainage; a friction tire on said centrifugal pump frictionally engaged to said centrifugal clutch, said centrifugal clutch driving said friction tire in any of the two opposite directions of rotation.

7 Claims, 11 Drawing Figures

PATENTED APR 23 1974  3,805,563

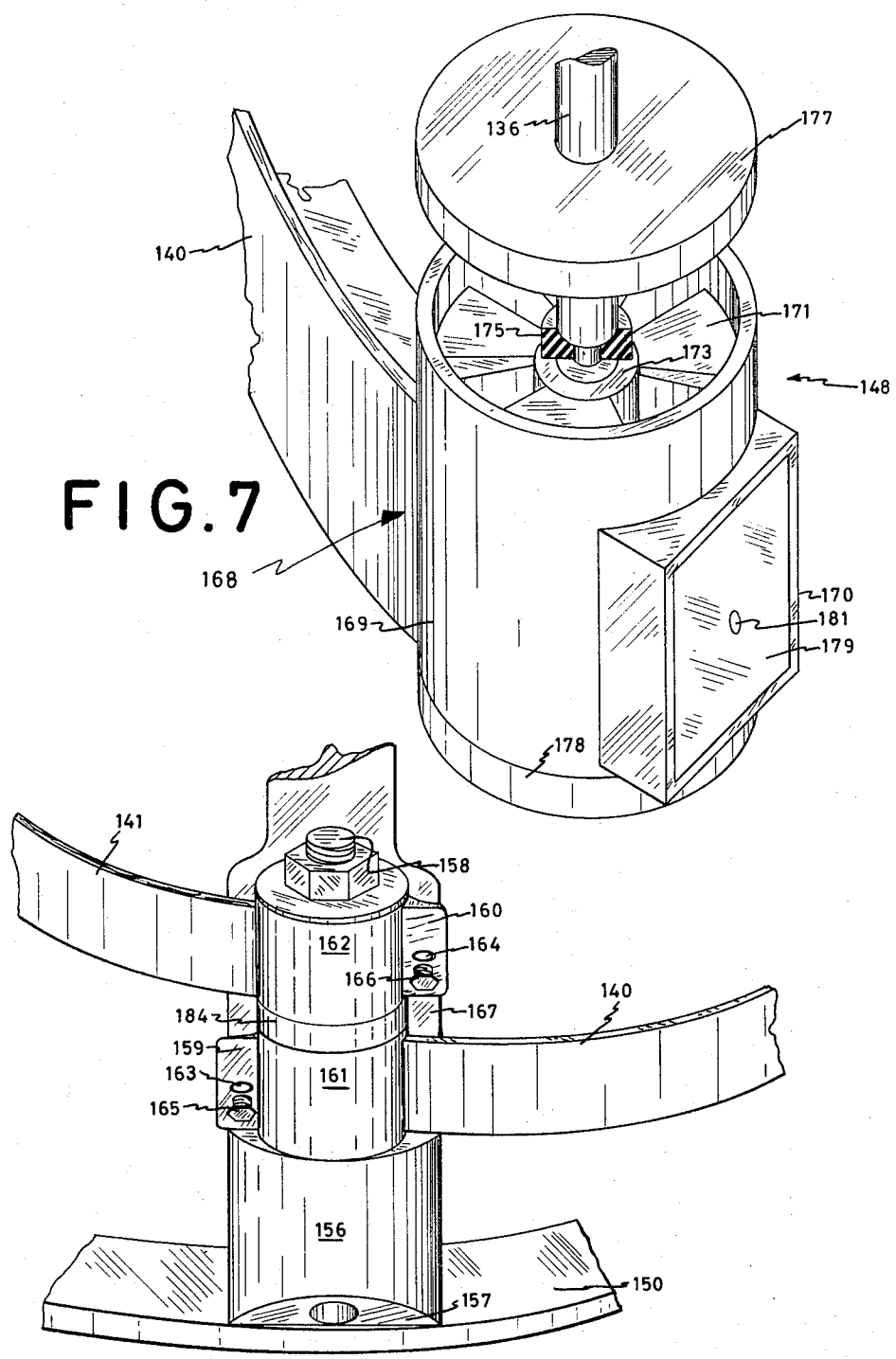

AUTOMATIC CLOTHES WASHING MACHINE

The present invention refers to clothes washing machines and, more particularly, is related to a domestic or commercial rotating drum-type washing machine, which is fully automatic and which effects the washing and drying operations by means of novel and highly simplified mechanisms.

BACKGROUND OF THE INVENTION

The domestic and commercial clothes washing machines of the prior art mainly comprise an imperforate stationary receptacle and a perforate rotatory basket, with the latter being driven by means of a rather complicated drive mechanism which requires of a motor which in the majority of the cases is very complicated, inasmuch as said motor must have a plurality of poles, for instance, 15 or 16 poles for each direction of rotation, or otherwise said type of washing machines require several motors, one for each direction of rotation and for each speed of operation, which obviously represents an unnecessary complication both from the technical and the commercial standpoints.

These prior art household and commercial washing machines show several very important drawbacks due to the deficiencies of the driving mechanism, such as the jerking action which is produced when passing from a high speed to a low speed of the basket, the jamming action due to overloads of said basket, a very high power consumption, and the use of servomechanisms which are in themselves of a very costly construction, as well as noisy due to the gears which must be included.

It can be seen from the above that the prior art washing machines, when comprising a driving mechanism capable of providing all the actuating motions from a single motor, generally contain a highly elaborate driving mechanism, which is difficultly accessible for repairs or replacements, and which constantly requires the service of highly specialized technicians in order to effect all the necessary repairs, servicing and maintenance.

Therefore, heretofore there has not been a mechanical clothes washing machine of a household or a commercial type which can be capable of effecting the necessary washing, rinsing and squeezing or centrifugating operations in a simple, automatic and trouble-free manner which may provide for the continuous use of this type of machines.

SUMMARY OF THE INVENTION

Having in mind the defects of the prior art clothes washing machines, it is an object of the present invention to provide an automatic clothes washing machine which is of a greatly simplified construction and of an extremely efficient operation.

It is another object of the present invention to provide an automatic washing machine of the above described character, which is provided with a driving mechanism very simple to build, to maintain and to repair, and which is practically trouble-free.

It is an additional object of the present invention to provide an automatic washing machine of the above mentioned character, which will be capable of sequentially effecting washing, rinsing and centrifugating operations by means of a very simple drive mechanism which depends on a single conventional motor capable of rotating in two directions and at two different speeds.

It is another object of the present invention to provide an automatic washing machine of the above mentioned character, which comprises supporting means very simple in their construction, in order to permit the disassembly and assembly of the washing machine with great simplicity and speed.

It is another object of the present invention to provide an automatic washing machine of the above described character, which will be arranged such that the shift from one operation to the other is effected very smoothly and without any jerking of the machine.

It is a more particular object of the present invention to provide an automatic washing machine of the above described characteristics, which will be capable of a fully automatic operation controlled only by the change of direction or of speed of the prime mover.

It is one additional object of the present invention to provide a simple and highly efficient drive for operating a fully automatic clothes washing machine, which drive will be capable of providing in a very simple manner the rotation of a basket at low speed, at an intermediate speed and at a high speed, and to simultaneously operate the necessary drainage pump when it is required.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIG. 7 is a fragmentary perspective view of the end of one of the supporting arms, with the speed reducing mechanism supported thereby;

FIG. 8 is a fragmentary perspective view of the pivotal support for the arms of the supporting structure in accordance with the present invention;

DETAILED DESCRIPTION

Figure 1:
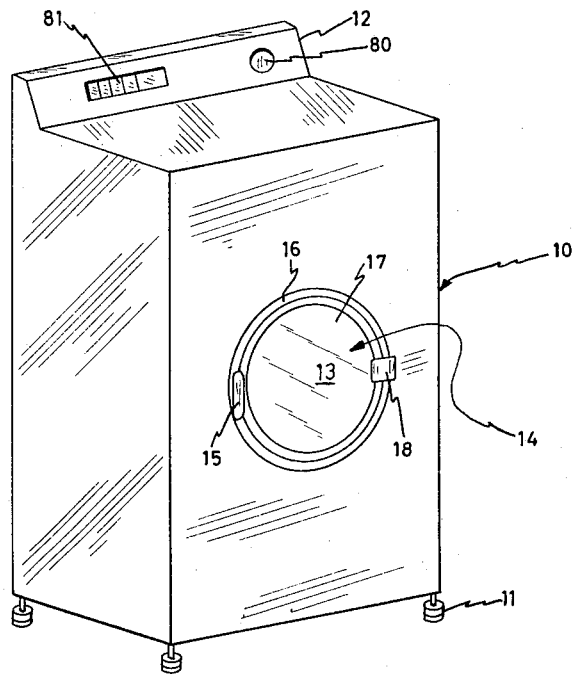
FIG. 1 is a perspective view of an automatic clothes washing machine built in accordance with the present invention.
Figure 2:
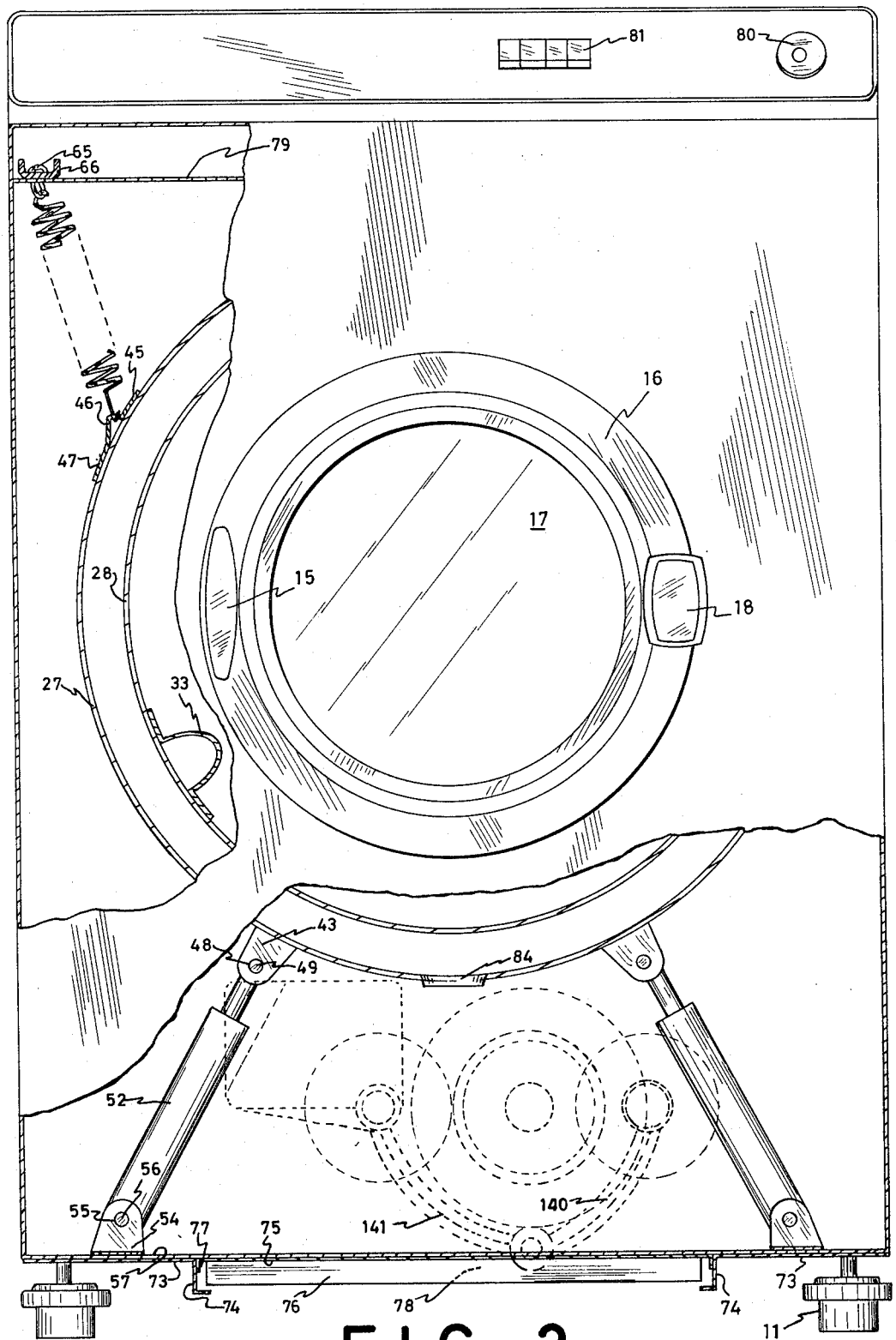
FIG. 2 is a front elevational view, partly broken away to show inner details and their arrangement, of the automatic washing machine built in accordance with the present invention.
Figure 3:
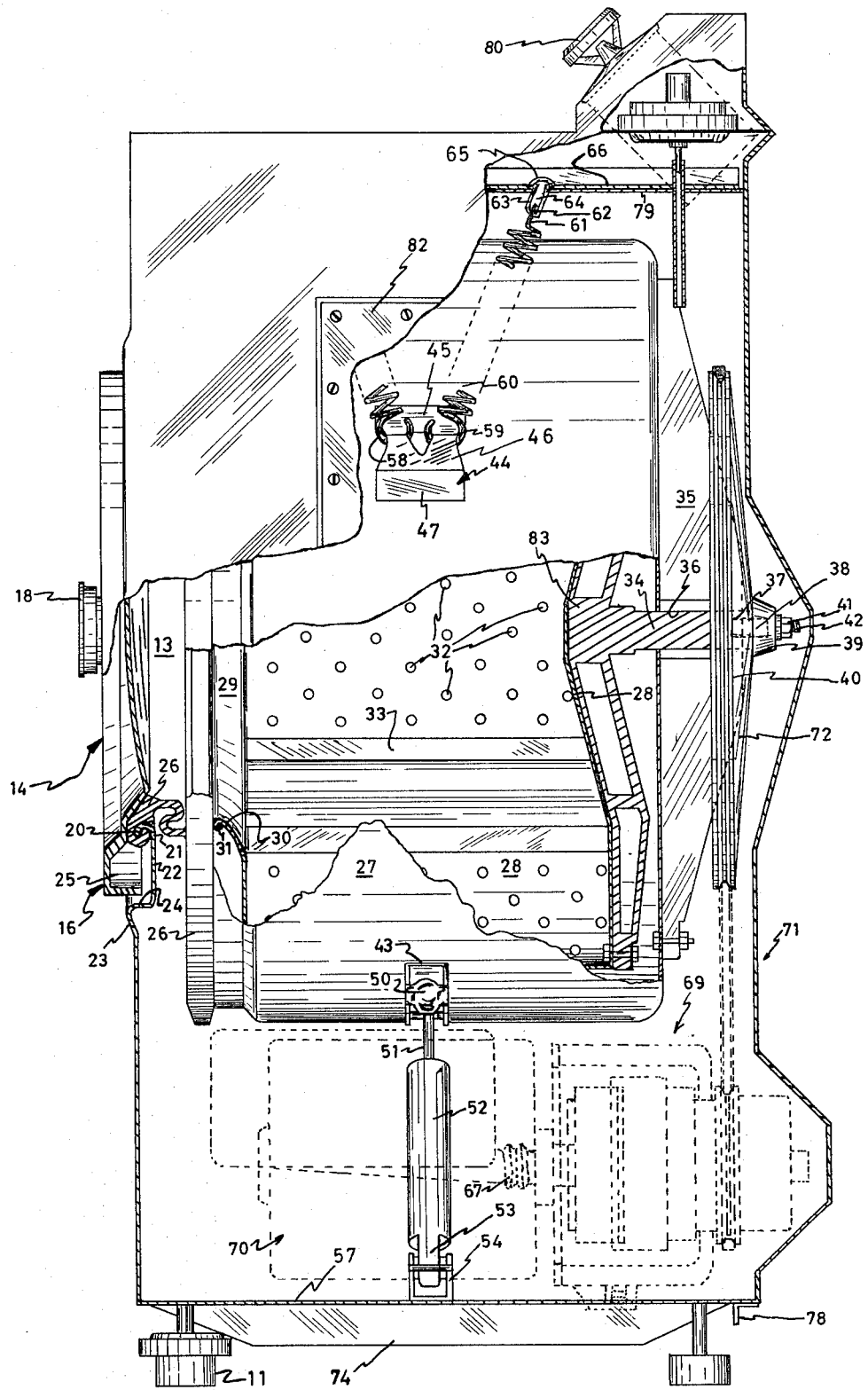
FIG. 3 is a side elevational view of the washing machine of FIG. 1, partly broken away to show the arrangement of inner parts thereof.

Having now more particular reference to the drawings, and more specifically to FIGS. 1, 2 and 3 thereof, the fully automatic clothes washing machine built in accordance with the present invention, is designed such that it is restricted to a single rotating basket and to a single operation space, and comprises a housing or cabinet 10 of rectangular shape, which covers the washing, rinsing and centrifugating basket, as well as the drive mechanism for carrying out all the necessary operations and movements for effecting the different operations in accordance with the present invention. All the thus formed assembly is supported by means of four leveling legs 11, located with a symmetrical distribution in each of the corners of housing 10.

On the top of cabinet 10, a control board 12 is provided adjacent the back of housing 10, and containing a single operation knob 80, as well as a number of pushbuttons 81 for selecting the necessary operation, that is, for selecting as between washing, rinsing or centrifugating.

The front face of housing 10 is provided with an opening or mouth 13 for charging or discharging the rotatory basket thereof. Mouth 13 has a circular configuration and is covered by a lid 14 of a diameter slightly larger than said mouth, pivotally supported on the left side, as seen in FIG. 1, by means of a hinge 15. The lid 14 comprises an annular frame 16 which supports a circular transparent plate 17 to form a window through which observation of the interior of the operational cavity can be effected. On the other side of hinge 15, the lid 14 is provided, on the solid or annular frame portion 16, with a snap acting locking device 18. As it can be seen in FIG. 3 of the drawings, the lid 14 comprises a cylindrical outer portion 16 which extends towards the outside of housing 10, forming a channel section 25 which has a shape such that it will be capable of pressing against a packing element 26 as will be described below. The front face of housing 10 is provided with a circular depression 22 to house the entire lid 14 and said depression is formed integrally with said front face of housing 10, by providing a circular ridge 23 which merges with a cylindrical wall 24 directed towards the interior of the housing, and then a circular wall 22 which forms the bottom of the depression for the lid 14, and which end 21 is bent outwardly in the form of a hook as shown in 20 in FIG. 3 of the drawings, in order to provide for the engagement of the packing element 26 which is thus firmly attached to the hook end 20 of the wall 22. The other end of the packing element 26, which is a standard type of cylindrical flexible packing element, is firmly engaged on the edge of the mouth of a fixed horizontal stationary cylindrical imperforate receptacle 27, which forms the operational cavity of the washing machine built in accordance with the present invention.

Concentrically arranged within the stationary receptacle 27, a rotating perforate basket 28 having a diameter smaller than that of receptacle 27, is provided, said concentrical rotatable basket 28 having a flaring circular mouth 29 opening on the front wall of basket 27, of a diameter approximately the same as the diameter of the entrance mouth 13 of housing 10, extending outwardly of the front face as indicated in 30 in FIG. 3, and provided with a rounded lip 31 at the edge thereof.

The inner rotatable basket 28 is provided with a plurality of small holes 32 uniformly distributed throughout its surface and is also provided with a plurality of transverse ridges 33 symmetrically arranged such as is shown in FIG. 2 of the drawings, preferably three in number, and longitudinally extending inwardly of the cylindrical inner surface of basket 28.

The rotatory basket 28 is rotatably supported at its back end by means of a supporting structure 83 which comprises a hub integrally formed with a shaft 34 which is rotatably supported within a cylindrical bore 36 centrally arranged on a supporting stationary structure 35 attached on the back of the stationary receptacle 27. The free end of shaft 34 is provided with a counterbore 37 which is internally threaded to threadably receive a shank 38 having a threaded end 42. A drive pulley 40 of relatively large diameter is inserted on shaft 34, at its free end, and is supported in its position by means of a coupler 39 received by shank 38, and fixed in its position by means of a nut 41 threaded on the threaded end 42 of shank 38.

The assembly formed by the outer stationary receptacle 27 and the concentrical rotatory perforate basket 28, is duly supported on housing 10 of the washing machine built in accordance with the present invention, by the provision of a pair of lugs 43 fixedly mounted on the lower part of the cylindrical wall of receptacle 27, as clearly shown in FIGS. 2 and 3 of the drawings, said lugs being in the form of forked members and being provided at its free ends with circular holes 48 through which a bolt 49 is inserted. Each bolt 49 supports a ball joint 50 which is fixedly mounted on the free end of a piston rod 51 of a shock absorber 52, one for each lug 43, and the respective shock absorbers 52 comprise an extension 53 at the lower ends thereof, which extension is supported on lugs 54 fixedly mounted on the reinforced bottom 57 of housing 10 of the washing machine, by means of a suitable pivot 56 passed through a pair of holes 55 on the forked members of lugs 54. The support of the stationary receptacle 27 is complemented by the provision of a pair of lugs 44 on the upper portion of the cylindrical surface thereof, as clearly shown in FIGS. 2 and 3 of the drawings, said upper lugs 44 being provided with two flat end portions 45 and 47 fixedly attached to said cylindrical wall, and an intermediate channel-like portion 46, having a triangular opening at the center thereof, in order to form a bifurcated section as shown in FIG. 3, through which the hook ends 58 and 59 of a pair of springs 60 can be inserted. Springs 60 run upwardly in the form of a "V" as shown in FIG. 3 of the drawings, and the upper hook end 61 of each spring 60 is engaged at 62 by the lower bight of an U-shaped support 63 which extends through the opening 64 of a channel-like member 66 suitably supported on the upper portion of housing 10, said U-shaped support 63 being fixed on the opening 64 by a flattened portion 65 thereof, as shown in FIGS. 2 and 3 of the drawings. Thus, it will be clearly seen that the stationary receptacle 27 and therefore the rotating basket 28, will be resiliently supported on the housing 10 of the washing machine, thus avoiding undue jerking of said housing when the speed of the pulley 40 is changed from a high speed to a low speed or when the motion thereof is reversed.

Figure 5:
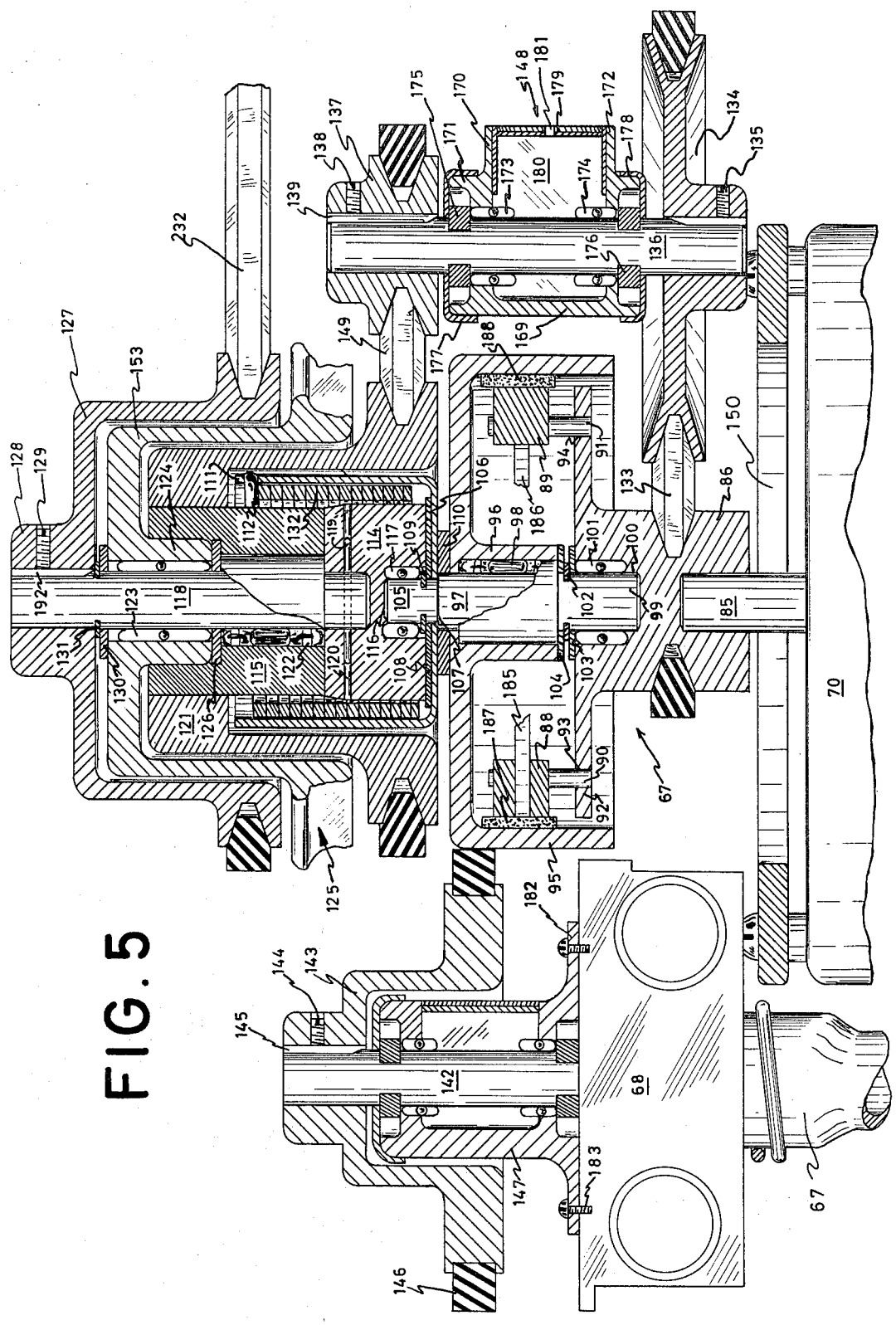
FIG. 5 is a cross sectional plan view of the drive mechanism shown in FIG. 4, showing all the inner details thereof.

The stationary receptacle 27 is provided with a drainage hole 84 at its lower end, as shown in FIG. 2 of the drawings, said hole 84 being directly connected through a flexible pipe 67 to a drainage pump 68 more clearly shown in FIG. 5 of the drawings, and which discharge is connected to a flexible drainage hose (not shown) of those commonly used in domestic washing machines.

In FIGS. 2 and 3 of the drawings there is also shown a drive mechanism 69 which will be more fully described hereinbelow, connected to a motor 70 to provide motion to the pulley 40, of the rotatory basket 27 as will be more fully described hereinbelow.

The back face 71 of housing 10 is formed such that it contains a pair of approximately frustoconical projections, one to house the dished form 72 of pulley 40 of the rotatable basket 28 as well as the free end 42 of the bolt inserted in shaft 34, and the other one to house the back portion of the drive mechanism 69 as shown in FIG. 3 of the drawings. The right side wall of housing 10, as also shown in FIG. 3 of the drawings, comprises a large preferably rectangular opening, covered by a lid 82, to give access to all the mechanisms of the washing machine built in accordance with the present invention, in order to facilitate assembly, disassembly or repair of any part of said mechanism. The bottom wall of housing 10, indicated by means of the reference character 57, is provided with a reinforcement structure formed by a pair of plates 73 firmly attached to the bottom 57 of housing 10, and extending from the sides thereof towards the center a small distance, and then being bent downwardly and again inwardly in order to form a channel-like reinforcement flange 74, having a trapezoidal shape as shown in FIG. 3 of the drawings. The reinforcement structure also comprises a central plate 75 bent at its side ends to form small flanges 77 engaged to flanges 74 of plate 73, and at its back portion in order to form a larger flange 76 to provide sufficient strength to the bottom 57. Finally, at the backward edge of bottom 57, an angular transverse member 78 is provided, to give still more strength to said bottom 57.

The top of housing 10 comprises a plate 79 which extends parallelly to the top cover of housing 10, as shown in FIGS. 2 and 3 of the drawings, in order to provide for further reinforcement of housing 10 and also to provide for the support of the channel-like members 56 which in turn support the members 67 from which the springs 60 depend.

Figure 4:
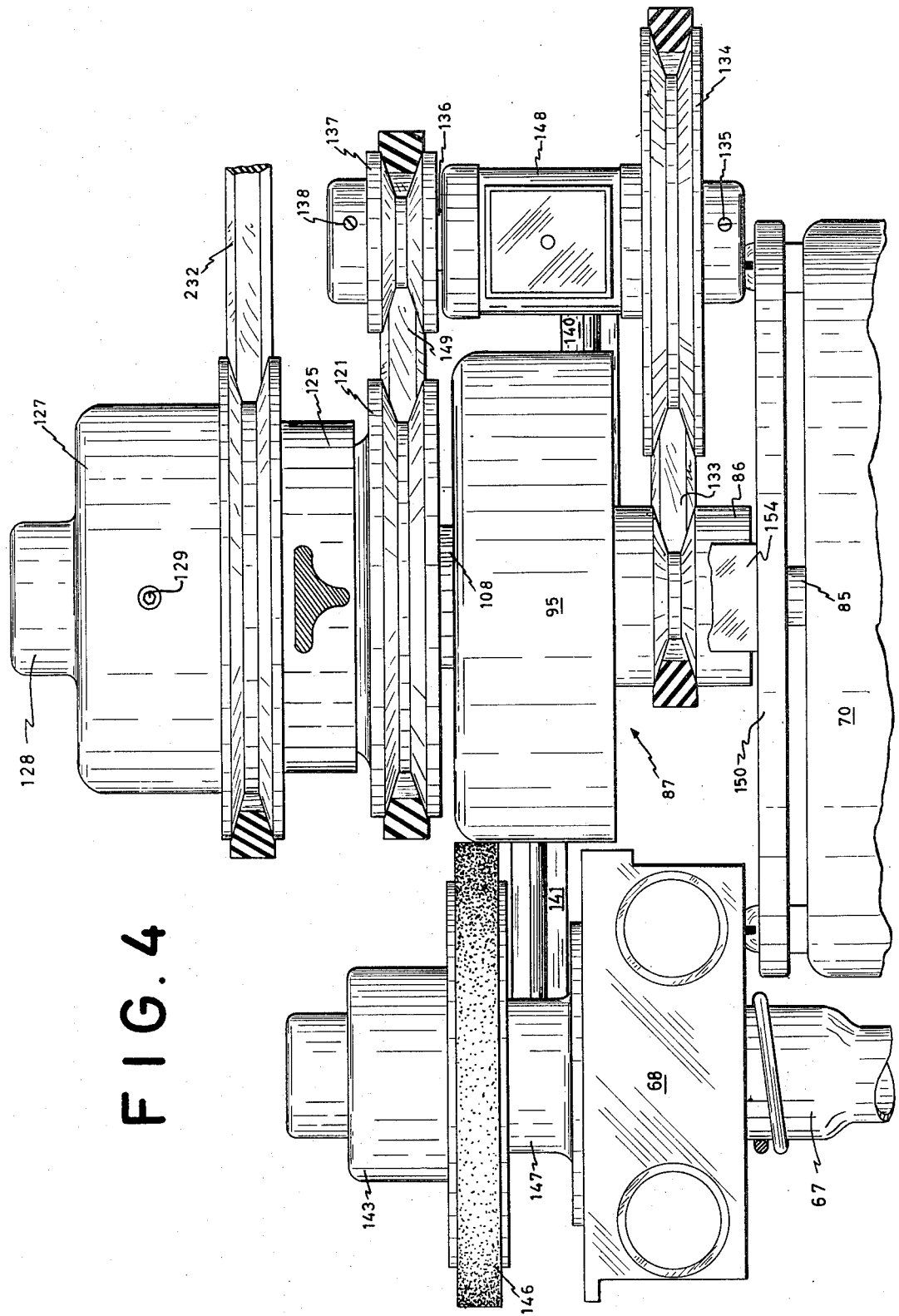
FIG. 4 is a top plan view of the drive mechanism of the automatic washing machine of the present invention, showing the arrangement of the different elements thereof.

Referring now to FIGS. 4 and 5 of the drawings, there is shown a drive mechanism for the automatic washing machine of the present invention, which is connected to a motor 70 (only partially shown), through a driving shaft 85 which mounts a pulley 86 which forms part of a centrifugal clutch 87. The centrifugal clutch 87 is formed by a pair of hubs 88, 89 fixedly attached to a respective pair of resilient bolts 90, 91, which resiliency is such that they will effect a clutching function as will be described below, said bolts 90, 91 being fixedly attached to pulley 86 by means of respective holes 93, 94 opened on a rectangular plate 92 of said pulley, said bolts 90, 91 being capable of certain degree of flexion caused by centrifugal rotational force. The hubs 88 and 89 form an integral part of a pair of shoes 185 and 186 of a braking mechanism, said pair of shoes 185 and 186 being lined with brake linings 187, 188 directly confronted with the side cylindrical wall of a drum 95 within which the plate 92 of pulley 86 is received. The drum 95 is rotatably mounted on a shaft 97 by means of an integral hub 96 between which an overrunning clutch 98 is inserted on shaft 97, which end 99 is rotatably mounted by means of a bearing 101 inserted on the bore 100 of pulley 86. The axial position of shaft 97 within the bore 100 of pulley 86 is fixed by means of a wahser 103 and an annular catch 102 inserted into a corresponding groove of shaft 97. A washer 104 is provided on the other side of catch 102 in order to fix the position of drum 95 with respect to pulley 86 in order to provide for the suitable performance of the centrifugal clutch generally indicated by means of the reference character 67 in FIG. 5 of the drawings.

The other end of shaft 97, indicated by means of the reference character 105, is provided with a shoulder 107 on which a receptacle 106 is supported, said receptacle 106 being fixed in its position on shaft 97 by means of a washer 106 placed on the other side of the receptacle, and a catch 109 inserted within a groove on the end 105 of shaft 97 as clearly shown in FIG. 5 of the drawings. Shaft 97 is provided with a longitudinally undercut section at its end 105 and the bore of receptacle 106 is cut complementarily to the cross section of the end 105 of shaft 97 such that the receptacle 106 rotates in unison with shaft 97 for a purpose which will be clearly described hereinbelow. The receptacle 106 is duly supported on drum 95 by means of a washer 110 received on shaft 97 as it can be seen in FIG. 5 of the drawings.

The receptacle 106 is provided with a groove 111 on its upper edge as shown in FIG. 5 of the drawings, through which an end 112 of a helical bendix type spring 113 concentrically arranged within the receptacle passes, a pair of colinear hubs 114 and 115 being provided concentrically to said helical spring 132. The hub 114 is provided with an axial bore 116 to be mounted on the end 105 of shaft 97 through a suitable bearing 117, and is also provided with an opposite axial bore for introducing thereinto a shaft 118 colinearly arranged to shafts 97 and 85 as shown in FIG. 5 of the drawings. A radial hole 120 is also provided through hub 115 and through shaft 118, in order to insert a set screw 118 to engage hub 114 to shaft 118 such that both will rotate in unison.

The hub 115 forms the central portion of a pulley 121 which is mounted through hub 115 on an overrunning clutch 122 mounted on shaft 118. Shaft 118 is rotatably mounted through a bearing 123 to a journal 124 of a supporting structure 125 which will be more fully described hereinbelow. Hub 115 of pulley 121 is provided with an axial bore to loosely receive journal 124 of the supporting structure 125, said journal 124 being spaced from hub 115 by means of a washer 126.

On the other or free end of shaft 118 an outlet pulley 127 is mounted, said pulley being hollow such that it is mounted on shaft 118 through a hub 128 which is fixed to said shaft by means of a setscrew 129, and the shape of pulley 127 is flared to form a large diameter section within which said pulley houses part of the supporting structure 125 which is concentrically arranged within the same. Pulley 127 is spaced from journal 124 of the supporting structure 125 by means of a washer 130 and a catch 131 inserted into a groove provided on shaft 118 in order to fix the axial position of the latter with respect to the remaining units. The outlet pulley 127 is engaged, through a belt 232, to pulley 40 of the rotating basket 28.

On the other hand, pulley 86 described above is engaged through a belt 133 to a pulley 134 having a larger diameter than pulley 86 and mounted by means of a setscrew 135 to a shaft 136 of the speed reducing mechanism generally indicated by means of the reference character 148 of FIGS. 4 and 5 of the drawings, the shaft 136 mounting, at the other end thereof, a pulley 137 of a smaller diameter than pulley 134, firmly engaged to said shaft 136 by means of a setscrew 138 and a spline device 139. Shaft 136 is rotatably mounted on one end of an arm 140 of the supporting structure 125 as shown in FIG. 4 of the drawings, through a bearing box 169 as will be described more fully hereinbelow. Pulley 137 is engaged through a suitable belt 149 to pulley 121 described above.

On another arm 141 of the supporting structure 125, a shaft 142 is mounted through a bearing box 147, said shaft 142 receiving a pulley 143 which is fixedly attached to said shaft by means of a setscrew 144 and a spline device 145. Pulley 143 is engaged through a rubber tire 146 (which can also be a suitable belt) to drum 95 of the centrifugal clutch 67, in order to provide a friction engagement between both elements.

The shaft 142 is rotatably supported through a bearing box 147 which forms part of the end of the supporting arm 140 which will be described more fully hereinbelow. Shaft 142 is connected on its end opposite to that mounting pulley 143, to a centrifugal pump 68 for draining the washing machine.

Figure 6:
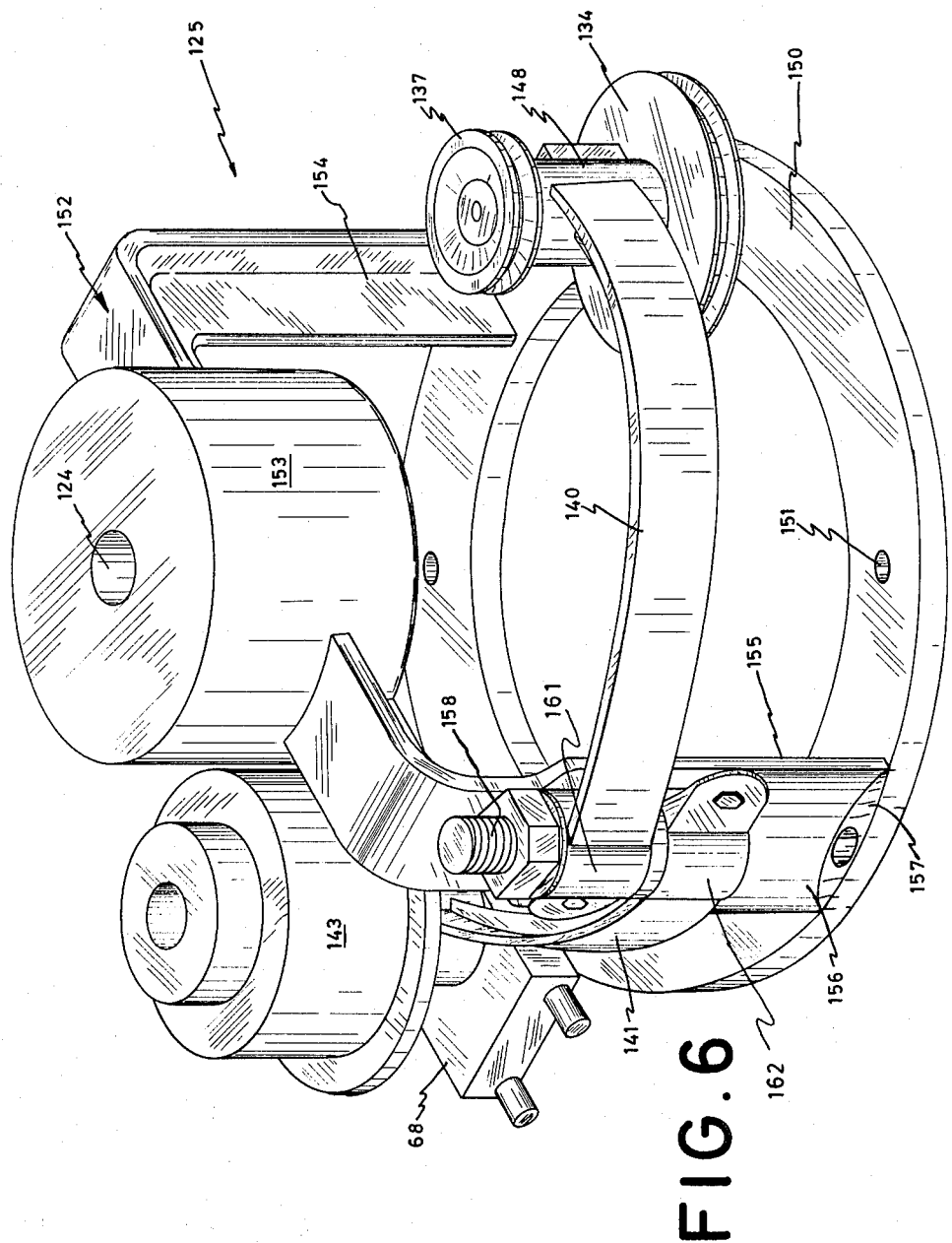
FIG. 6 is a perspective view of the supporting structure for the drive mechanism of FIGS. 4 and 5.

Referring now to FIGS. 6, 7 and 8 of the drawings, there is shown a particularly preferred supporting structure generally designated by means of the reference character 125. As it can be clearly seen in FIG. 6 of the drawings, the supporting structure 125 comprises a ring 150 provided with a suitable number of bores 151 to mount thereon the motor 70 by means of suitable bolts. The supporting structure 125 also comprises a frame member 152 which, in its upper portion and centrally thereof, mounts a cylindrical hollow body 153 having the journal 124 described above. The free ends of frame 152 are firmly attached to ring 150 such that the members 154 and 155 of the frame member 152 will be arranged perpendicularly to the ring 150.

Figure 9:
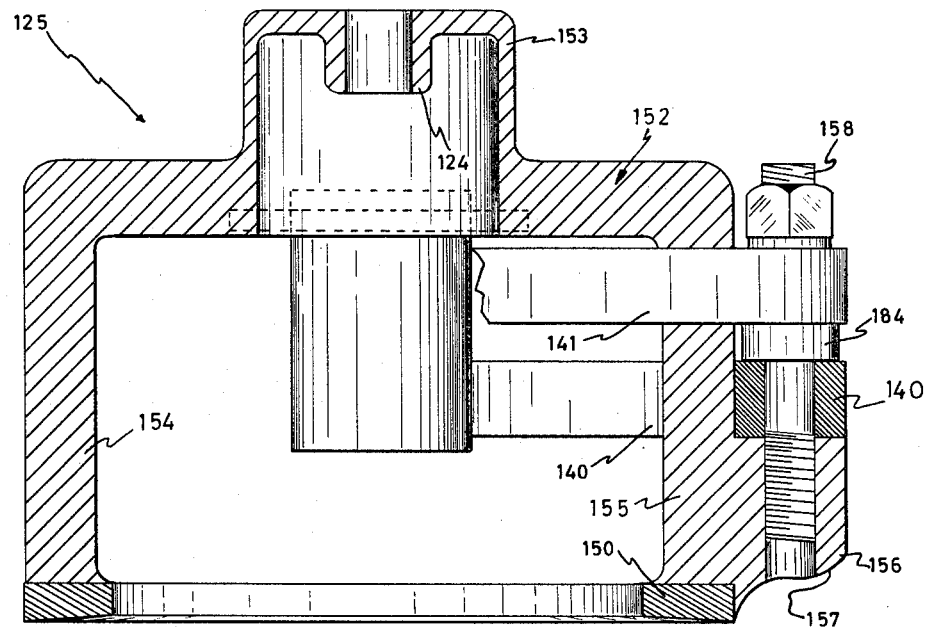
FIG. 9 is a cross sectional side elevational view of the supporting structure, showing the pivotal support for the arms which in turn support the pump and the speed reducing mechanism.

The frame member 152 is formed by means of an integral member having a T-shaped cross section, with the bar of the T towards the exterior and the foot of the T towards the interior. A semicylindrical projection 156 is provided on member 155 of frame 152, said cylindrical projection 156 having an inclined face 157 at the lower end thereof, to be suitably engaged to ring 150 as shown in FIG. 9 of the drawings. The semicylindrical projection 156 of frame 152 is axially bored in order to receive a bolt 158 threadably engaged into the bore of the projection 156 as clearly shown in FIG. 9 of the drawings. The bushings 159 and 160 of a pair of supporting arms 140 and 141, respectively, are engaged on the bolt 158 and suitably fixed by means of a nut.

The arms 140 and 141 in its assembled position, and due to its curved shape, form an approximately semicircular support, said arms being pivotable about bolt 158, through suitable bushings 161 and 162 respectively, which bushings have a cylindrical shape and are centrally bored to permit passage of bolt 158. On the ends 159 and 160 of arms 140 and 141 there are provided suitable bores 163 and 164 respectively, to receive screws 165 and 166 which level the position of the curved arms 140 and 141 when the screws are threadably engaged into holes 163 and 164 of the member 155 of frame 152 and more particularly on the widened section 167 thereof. The screws 165 and 166 are provided for fixing the position of arms 140 and 141 and for setting the tension or pressure thereof in order to duly control the tightening of belts 133 and 149 as well as the pressure of the tire 146 for a purpose which will be obvious to anyone skilled in the art. It is to be noted that the position of arms 140 and 141 on bolt 158 can be interchanged without thereby affecting the performance of the device, inasmuch as the tire 146 can be contacted with the outer wall of drum 95 at any position thereof, and the position of pulleys 134 and 137 can be adjusted to match in line with the position of the belts 133 and 149, respectively.

The end 168 of arm 140 supports a bearing box 148 comprising a cylindrical body 169 with a rectangular projection 170 having a lid 179 provided with a small central bore 181 to provide for the suitable evaporation of the lubricating material which is inserted therein as will be described in more detail hereinbelow. The bearing box 148 is hollow and comprises an inner upper flange 171 (see FIG. 5 of the drawings) and an inner lower flange 172, on which a pair of bearings 173 and 174 are mounted by a pressure fit. Said bearings 173 and 174, which can be of a self-lubricated type, rotatably mounted shaft 136 of the speed reducing mechanism, and shaft 136 is fixed in its axial position by means of a rubber catch 175 on one end of box 148 and a rubber catch 176 at the other end thereof, both catches being fixed in their positions by means of suitable lids 177 and 178 engaged to both ends of box 148.

Within the hollow space formed in box 148, a lubricating material 180 is located, such as the well known lubricating wicks named "permawick." The lubricating material is protected by means of lid 179 which is inserted on the opening of box 170, and the small bore 181 is provided for avoiding undue rises of the pressure in housing 180.

The bearing box 147 of the supporting arm 141 is more or less similar to the bearing box 148 previously described and comprises an annular flange 182 and a cylindrical body 147 proper, the shaft 142 being duly supported by means of suitable bearings as shown in FIG. 5 of the drawings. The centrifugal drainage pump 68 is fastened to flange 182 by means of screws 183, the lubricating material being inserted within the hollow interior of box 147. A further description of this bearing box is not considered to be necessary, inasmuch as the structure and performance thereof is exactly the same as those of box 148 previously described.

As shown in FIG. 9 of the drawings, it can be clearly seen that the arrangement of arms 140 and 141 is such that they are spaced by means of a spacer 184, and pressed by means of the nut threadably engaged to bolt 158 inserted within the bore of member 156, in order to provide for a friction type engagement of said arms 140 and 141 to the supporting structure 125.

Figure 10:
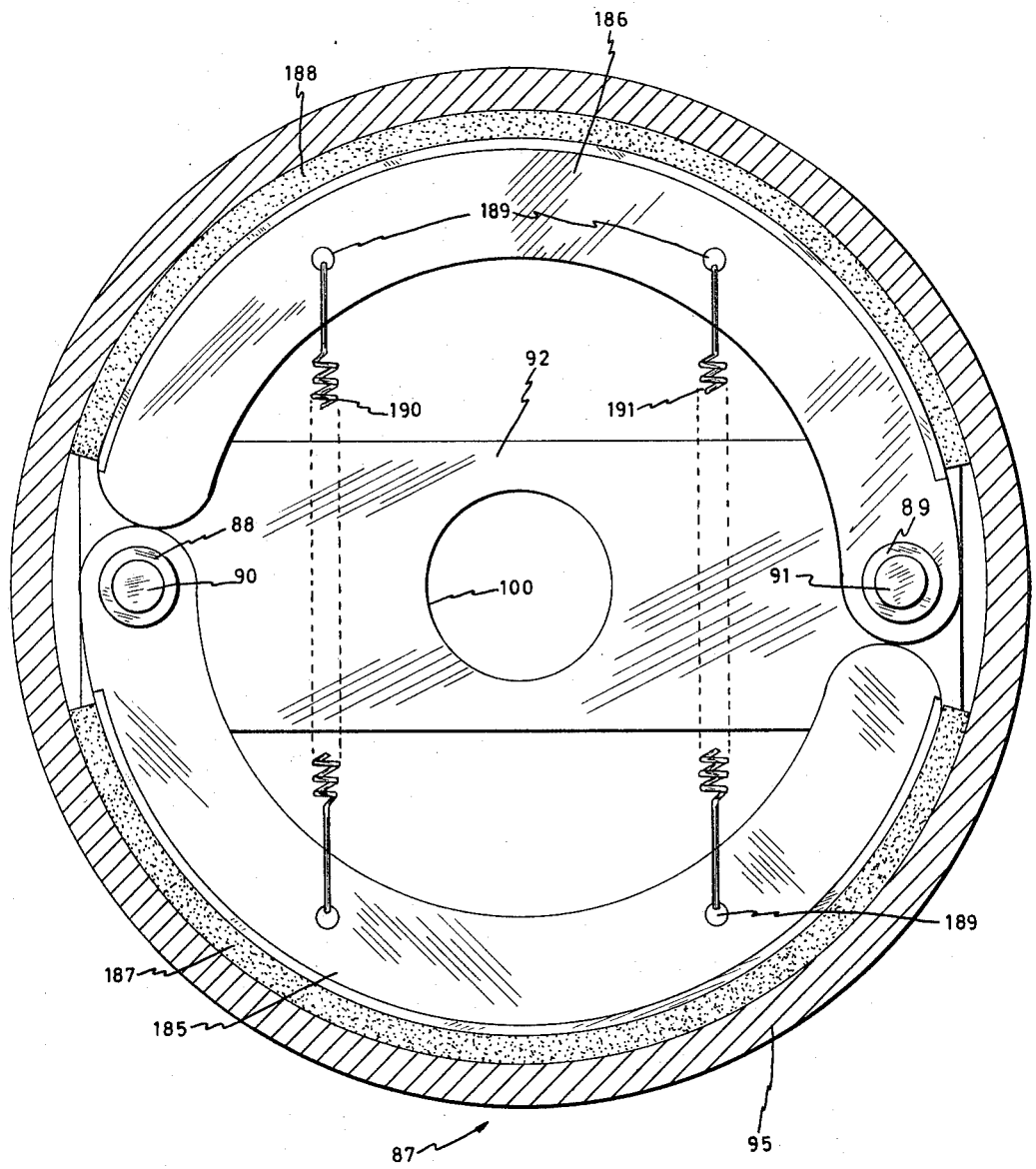
FIG. 10 is a cross sectional detailed view of the centrifugal clutch with the brake linings shown in braking position.
Figure 11:
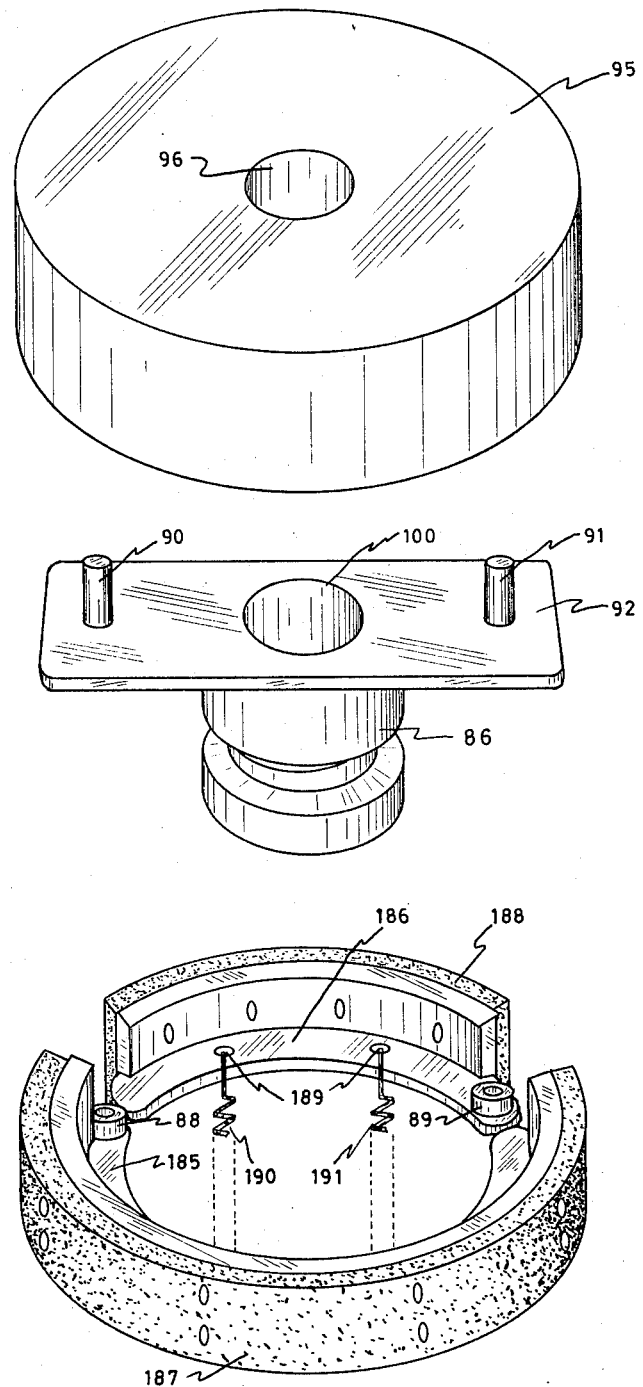
FIG. 11 is a detailed exploded perspective view of the centrifugal clutch and brake linings shown in FIG. 10.

The centrifugal clutch 87 which forms an important part of the mechanism of the present invention is shown in full detail in FIGS. 10 and 11 of the accompanying drawings, and comprises a plate 92, preferably in the form of a rectangular flat member containing the flexible or resilient bolts 90 and 91, integrally built with the pulley 86, to support the hubs 88 and 89 of a pair of shoes 185 and 186, each of which is provided with a brake lining 187 and 188 and a pair of holes 189 which support the ends of a corresponding pair of helical tension springs 190, 191 which bias the shoes 185 and 186 towards the center of the device. The shoes 185 and 186 are preferably of a semicircular shape and have a T-shaped cross section, such that the bar of the T supports the corresponding brake linings 187 and 188. Said brake linings, when the clutch is rotated at a high speed, are pressed against the interior surface of the cylindrical wall of drum 95, as shown in FIGS. 10 and 11 of the drawings, in order to engage said drum 95.

The type of operations to be effected by the washing machine built in accordance with the present invention can be selected by means of a suitable control board and more particularly by means of a set of push buttons 81 and a rotating knob 80 having a timer mechanism, so as to select a fully automatic operation, or so as to select a single predetermined operation which can be washing, rinsing, centrifugating and/or drainage of the washing machine.

As it will be obvious to anyone skilled in the art, the drive mechanism shown in FIGS. 4 and 5 of the drawings is capable of effecting a plurality of operations which, as mentioned above, can be suitably controlled to be either sequentially effected by means of a timer circuit, or to be effected by the selection of a predetermined push button contained in the control board.

The performance of the novel drive mechanism of the present invention may be described as follows, by using the logic sequence of operations which will be selected by any timer circuit of the type which can be used in a conventional clothes washing machine.

When the motor 70 is rotated in a first of two predetermined directions and at a low speed, the motion of the shaft 85 of motor 80 is transferred to pulley 86 and, as in this particular case the speed of rotation of pulley 86 is low, it will not be capable of bending the bolts 90 and 91 of the centrifugal clutch 87 in order to engage the brake linings 187 and 188 against the drum 95. Therefore, drum 95 is not driven by this motion of motor 70 and the drive is effected through belt 133, pulley 134, shaft 136, pulley 137, belt 149, pulley 121, hub 115 and thence, through the bendix spring 132 which is assumed to engage hubs 115 and 114 in this first direction of movement, through shaft 118, pulley 127 and belt 232 to the pulley 40 of the rotatory basket 28. Of course that in this particular instance, the bendix spring 132 will carry therewith receptacle 106, shaft 97, overrunning clutch 98, drum 95, tire 146, pulley 143, shaft 142 and pump 68, but at such a low speed that said pump will not be able to properly operate and no pumping action will be effected.

The differences in the diameters of pulleys 86, 134 and 137 is such that the speed of the motor 70 is reduced, for instance, from a standard low speed of 1,150 r.p.m., to about 550 r.p.m., which is still reduced by the difference in diameters of pulleys 127 and 40, in order to rotate the basket 28 at a low speed, as is necessary, for instance, to wash clothes within said basket, with water at a suitable level in the basket.

The timer mechanism, after a suitable period of washing, can then reverse the direction of rotation of motor 70 to effect a second washing period, either with an intermediate rinsing and draining period or without it. When the direction of motor 70 is reversed, at low speed, the system will operate in this second direction of rotation through the route of shaft 85, pulley 86, belt 133, pulley 134, shaft 136, pulley 137, belt 149, pulley 121, hub 115 and, as in this second direction of rotation the overrunning clutch 122 will be engaged, then through said clutch to shaft 118, pulley 127, belt 232 and pulley 40 to the rotatory basket 28. In this second direction of rotation of hubs 114 and 115 with respect to receptacle 106, the spring 132 will be loose from hub 114 but receptacle 106 will be rotated by hub 115 the same as above, up to the overrunning clutch 98 which is disengaged in this second direction of rotation.

The preselected timer mechanism can then operate the circuits such that the motor 70 is stopped, and after a suitable period of time started again to rotate in the above mentioned first predetermined direction and at a high speed, with which the draining and rinsing period will be started. The draining and rinsing period requires that the pump 68 be operated and at the same time that the rotating basket 28 is also operated at an intermediate speed which may not be considered as a centrifugating speed, while water may be thrown over the clothes, so as to carefully rinse the same during a reasonable period of time, and at the same time water is expelled by pump 68. In order to effect the above mentioned required operations, the motor 70, which is now rotating at a high speed, will drive the pulley 86 and also the plate 92 at a high speed, so that the bolts 90 and 91 will be bent against the strength of springs 190 and 191 and thus the shoes 185 and 186 will push the brake linings 187 and 188 against the interior surface of the cylindrical wall of the centrifugal drum 95, thus providing for rotation of drum 95 at the same speed provided by motor 70 as will be clearly seen through an inspection of FIG. 5 of the drawings. The drum 95, therefore, will frictionally drive tire 146 connected to pulley 143, which will rotate shaft 142 and thus the impellers of the centrifugal pump 68, which will then suck the water contained in basket 28 and receptacle 27, to be expelled through the drainage line 67. As the drum 95 is mounted on shaft 97 by means of the overrunning clutch 98 which is not engaged in this direction of rotation of drum 95 with respect to shaft 97, then the shaft 97 will not be driven by drum 95, whereby the rotational movement is transmitted to the rotating basket 28 through the speed reducing mechanism described above, that is, through belt 133, pulley 134, shaft 136, pulley 137, belt 149, pulley 121, hub 115, bendix spring 132, hub 114, shaft 118, pulley 127, belt 232 and pulley 40. Therefore, the rotating basket 28 will rotate at a speed intermediate to that provided when the motor was operated at a low speed, but still insufficient to be considered as a centrifugal speed, because of the speed reduction effected by mechanism 148 described above. In this particular case the spring 132 will carry therewith the receptacle 106 and shaft 97, but, as the drum 95 is rotating at high speed, it will be clear to anyone skilled in the art that this will create a condition in which the relative rotation of shaft 97 with respect to drum 95 will be such that the overrunning clutch 98 will be disengaged, whereby the rotation of shaft 97 will not be transmitted to drum 95, and the latter can rotate independently as described above.

This operation will provide for a prerinsing of the clothes by means of a stream water thrown on said clothes, and will lower the level of water from basket 28 and receptacle 27, in order to avoid undue jerks of the machine when the centrifugation operation starts.

After drainage of the baskets 28 and receptacle 27, the device will be ready to effect a centrifugating operation to duly expel as much of the water as possible, and to completely rinse the clothes washed in the basket 28, and to this end the motor 70 is rotated in a second predetermined direction, opposite to said first predetermined direction, and at said high speed, with which the motion of shaft 85 of motor 70, will be transmitted to the centrifugal pump 68 exactly in the same manner described in the above paragraphs, but in the opposite direction. The centrifugal pump 68 is of a very well known type having two different centrifugal impellers (not shown) with vanes oppositely directed and located in different pumping chambers, such that when the direction of rotation of the pump 68 is effected in one predetermined sense, a first impeller will operate while the other will not operate, and in a second predetermined direction of rotation, the second impeller will operate, while the first impeller will not operate. In this manner, the centrifugal pump is capable of pumping water in any of the two directions of rotation, provided that said rotation is effected at a high speed.

In this second direction of rotation, however, the overrunning clutch 122 will be disengaged, inasmuch as shaft 118 is rotating at a high speed as compared to hub 115, therefore, hub 115 of pulley 121 will be loosely arranged around shaft 118, so that shaft 118 will be completely disengaged from the speed reduction mechanism provided by pulleys 134, 137 and 121. The rotational high speed movement of shaft 85, however, is directly transmitted to pulley 40 through the operation of the centrifugal clutch 87, which, in this direction of rotation, has its overrunning clutch 98 engaged, such that the rotation of drum 95 is directly transmitted to shaft 97 through the overrunning clutch 98. The shaft 97, which is firmly engaged to receptacle 106, rotates the latter and said receptacle, in this direction of rotation, will carry the end 112 of the helical spring 132 by means of its groove 111, such that the spring 132 will remain firmly closed around hub 114, but will release hub 115, and being hub 114 firmly engaged to shaft 118 by means of the setscrew 119, shaft 118 will be rotated at the same speed as shaft 85, but with the acceleration duly controlled by the slippage of hub 114 on the inner surface of spring 132, as will be clearly apparent to anyone skilled in the art, such that undue jerks of pulley 40 are avoided. Shaft 118, transmits its rotational movement through pulley 127 and belt 232 to the pulley 40 of basket 28 which is then rotated at a very high speed suitable for effecting centrifugation of the clothes contained therein, to expel all the water from the clothes.

From the above it can be seen that that has been provided a highly simplified drive mechanism for a fully automatic clothes washing machine, which can effect all the necessary operations by means of a highly simplified mechanism, which may be considered as very compact, inasmuch as it comprises a plurality of colinearly arranged shafts. The mechanism of this invention can also be considered as a shock-free mechanism, in view of the very few movable parts thereof. The simplicity of this device can also highly simplify repair, replacement and general maintenance, contrary to what has been considered necessary in connection with all the prior art highly complicated drive mechanisms for fully automatic clothes washing machines of the type disclosed.

Although certain specific embodiments of the present invention have been shown and described above, it is to be considered that many modifications thereof are possible. The invention, therefore, is not to be restricted except insofar as is necessitated by the prior art and by the spirit of the appended claims.

What we claim is:

1. An automatic clothes washing machine which comprises a housing, a stationary receptacle with its axis horizontally arranged within said housing, a rotatory basket arranged with its axis colinear to the axis of said stationary receptacle and concentrically arranged therewithin, an opening in one of the side walls of said housing, a lid to cover said opening, and a drive mechanism comprising a motor capable of rotating at a first or low speed and at a second or high speed in a first and a second directions, a drive pulley on a first shaft of said motor, a speed reducing mechanism engaged to said drive pulley, a centrifugal clutch engaged to said drive pulley, a first overrunning clutch directly coupled to said centrifugal clutch; a second shaft colinear to said first shaft directly engaged to said overrunning clutch and with its free end engaged to a receptacle of a bendix spring-type clutch, a first hub arranged within said receptacle and engaged to the spring of said bendix type clutch, said first hub being directly engaged to rotate in unison with a third shaft colinearly arranged with respect to the two above mentioned shafts; a second overrunning clutch on said third shaft, a second hub colinearly arranged to the first mentioned hub and mounted on said second overrunning clutch to rotate in unison with said third shaft only in a predetermined direction of rotation thereof; a pulley attached to said second hub and connected by means of a belt to the outlet pulley of said speed reducing mechanism; an outlet pulley engaged to the end of said third shaft and connected to the pulley of said rotatory basket by means of a belt; a drainage pump having a tire directly coupled with the impellers thereof and rotatably engaged to the outer surface of said centrifugal clutch, said centrifugal clutch being operable at said second or high speed of the motor and being inoperable at said first or low speed of the motor in any direction of rotation thereof.

2. An automatic clothes washing machine according to claim 1 wherein said speed reducing mechanism comprises an entrance pulley having a large diameter as compared to the diameter of said drive pulley of the motor, a shaft directly attached on one of its ends to said entrance pulley and with the other of its ends directly attached to an outlet pulley having a diameter comparatively smaller than the diameter of said entrance pulley in order to produce a reduction in the speed, said outlet pulley being directly connected by means of a belt to the pulley attached to said second hub in order to transmit movement to the pulley of the rotatory basket; said shaft of the speed reducing mechanism being rotatably supported on suitable bearings contained in a hollow box in which a wick-type lubricating material is held.

3. An automatic clothes washing machine according to claim 1 wherein said pump is connected to the tire by means of a shaft rotatably supported on suitable bearings contained within a hollow box in which a wick-type lubricating material is held.

4. An automatic clothes washing machine according to claim 1 wherein said centrifugal clutch comprises a plate integrally formed on the free end of the drive pulley of said motor, a plurality of resilient bolts situated close to opposite edges of said plate and extending at right angles from the surface thereof, a corresponding plurality of shoes firmly attached to the free ends of said resilient bolts, a corresponding plurality of brake linings placed on the entire surfaces of said shoes such that their frictioning surface will be arranged at right angles with respect to said plate and on the edges thereof; a rotatable drum concentrically situated around said brake linings, said drum being supported on said second colinear shaft, through said first overrunning clutch such that, when the motor actuates at said high speed in any of the two opposite directions of rotation, the resilient bolts are bent by centrifugal force, thus applying the brake linings onto the inner surface of the side wall of said drum, whereby the latter is rotated at a correspondingly high speed, said resilient bolts having strength such that they will not be bent when the plate member is rotated at said low speed in any of the two directions, thereby avoiding actuation of the centrifugal clutch when the motor is running at low speed.

5. An automatic clothes washing machine according to claim 1 wherein said bendix type clutch is provided with a helical spring having one of its ends inserted within a corresponding groove of said receptacle such that, when the receptacle is rotated in the second of said directions, said spring will release said second hub such that when the receptacle of the bendix clutch is rotated by said second shaft, it will carry said first hub and therefore the third shaft to rotate said rotating basket at a high speed, said first overrunning clutch being capable of disengaging said centrifugal clutch from said second shaft, whereby, when the motor rotates in the first of said directions, the drum of the centrifugal clutch will be disengaged from said second shaft.

6. An automatic clothes washing machine according to claim 1 wherein said drainage pump and said speed reducing mechanism are supported on the drive of the washing machine by means of a support comprising a rigid ring, a rectangular frame extending from one point to a second point diametrically opposed to said first point of said ring, a journal centrally situated to said frame so as to receive the end of the outlet shaft of said drive, a first curved resilient arm pivotally attached at one of its ends to said frame and rigidly attached at the other of its ends to the bearing box which houses the shaft of the drainage pump, and a second curved resilient arm oppositely directed with respect to said first arm and pivotally attached to said frame, said second arm having its free end firmly attached to the bearing box which houses the shaft of said speed reducing mechanism.

7. An automatic clothes washing machine according to claim 1 wherein said stationary receptacle and said rotatory basket concentrically arranged with respect to each other are supported by a plurality of shock absorbers attached at one of their ends to the cylindrical wall of said stationary basket and at the other of their ends to the bottom wall of said housing, and a plurality of tension springs attached at one of their ends to the cylindrical wall of said stationary basket and at the other of their ends to the top wall of said housing, such that the rotation of the rotatory basket and the change of direction or of speed thereof will not transmit vibrations to said housing.

* * * * *